Aug. 4, 1959     H. CHAPMAN     2,897,588
SELECTED AREA GALVANIZING METHOD
Filed Dec. 12, 1955
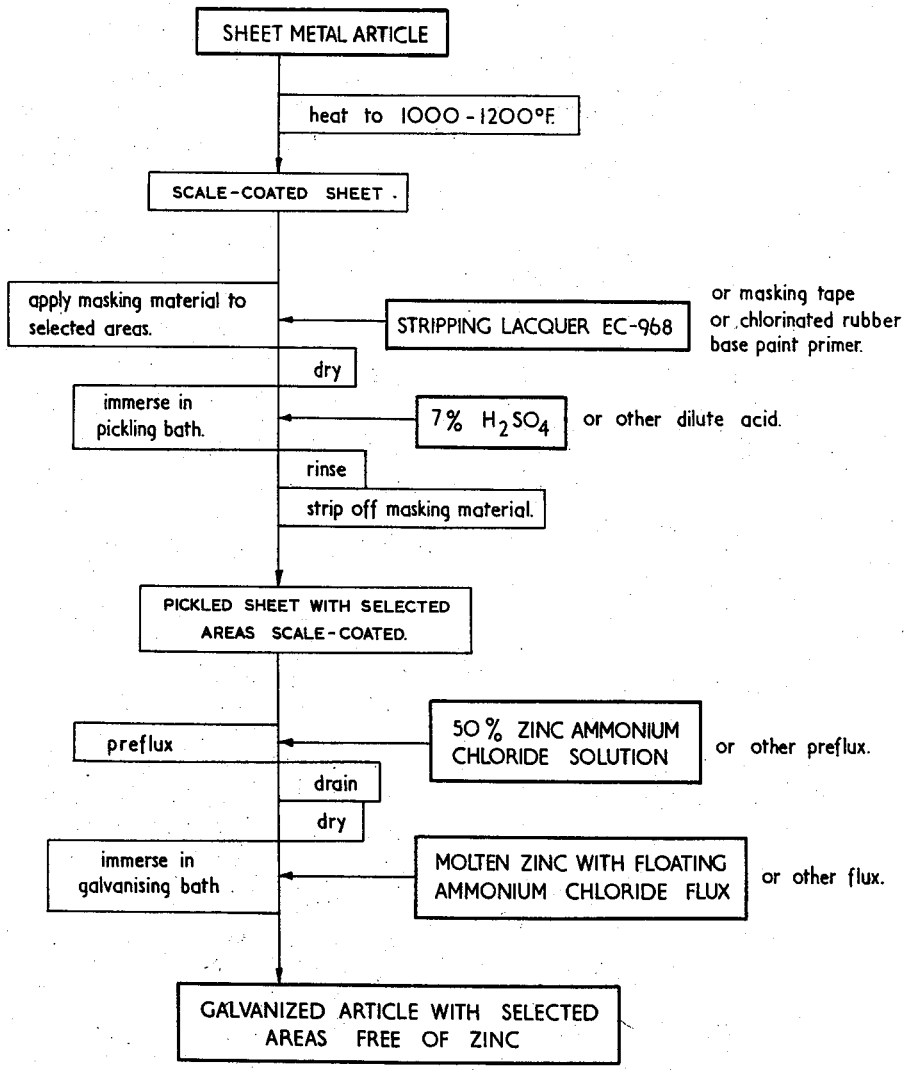
Inventor
HERBERT CHAPMAN
by
*Maybee & Legris*
ATTORNEYS

2,897,588
SELECTED AREA GALVANIZING METHOD

Herbert Chapman, Toronto, Ontario, Canada, assignor to General Steel Wares Limited, Toronto, Ontario, Canada, a corporation Application December 12, 1955, Serial No. 552,297

7 Claims. (Cl. 29—527)

This invention relates to a method of galvanizing selected areas of a sheet metal article while leaving other areas free of zinc.

Articles made of sheet steel and welded construction that are to be galvanized are normally first assembled by welding, and then galvanized by immersion. For instance, in the manufacture of range boilers, the boiler is completely assembled by welding before being galvanized. Then to coat the closed-in inside surface, the molten zinc must enter and leave the boiler through spud holes. The result is that the inner coating is likely to be uneven and to be marred by flux spots. This means premature failing of the boiler where the coating is thin, and corrosion by the electrolytic flux spots if the boiler becomes damp during storage. Furthermore, in such articles proper inspection of the inner coating is impossible.

Galvanizing is much facilitated if it is done on open shells that still require final assembly, but then the zinc coating hampers subsequent welding operations. Zinc boils at a lower temperature than the iron in the weld melts—1663° F. as compared to 2800° F.—and only by very slow hand welding it is possible to make the final assembly by welding through the zinc coating. Any form of fast arc-welding causes serious blistering and unsound welds, because insufficient time is allowed for complete volatilization of the zinc before completion of the weld.

The accompanying drawing is a flow sheet showing the steps of a galvanizing process incorporating the invention.

According to the invention, the zinc coating is limited to selected areas, leaving the areas which are to be welded free of zinc. This is done by retaining an impervious oxide film on such areas (or by specially producing and then preserving such an oxide film) through the pickling bath, by means of a suitable mask. The oxide film that normally coats hot-rolled or heated steel is a complete barrier to the galvanizing process and the zinc coating will therefore be limited to the areas that were not masked. The mask may be removed if desired after pickling but in any case will be destroyed in the zinc bath if left on.

Artificial scale must be provided whenever the welding that is carried out before galvanizing is in the same general location as welding to be carried out after galvanizing, for the prior welding removes all the mill scale from the area of the weld. If it is necessary to produce artificial scale, this is easily done by heating the steel to a temperature between 1000° and 1200° F. for a few seconds.

Masking of the mill scale or oxide film can be carried out by applying any tightly adhered material that is impervious to the acid pickling bath solution to be used, and that is destructible by the galvanizing bath; some of these materials may be removed after pickling and before galvanizing if desired. For instance, stripping lacquers, masking tapes and paint primers that will resist the acid sufficiently are suitable. The preferred material is a standard type of stripping lacquer specially compounded for maximum viscosity and manufactured by Minnesota Mining and Manufacturing Company of St. Paul, Minnesota. It is sold under the name "EC-968". Another suitable masking material is the standard type of masking tape manufactured by the same company. Both these materials may be stripped off the work before galvanizing, or left on if desired. A suitable non-strippable material is a chlorinated rubber base paint primer. These masking materials, if left on through the galvanizing process, are either completely removed by the action of the molten zinc, or they are charred and loosened to such an extent that they can easily be brushed off before further welding is carried out.

The masking materials may be applied by conventional methods. Lacquer EC-968 is most easily applied by dipping, but any conventional coating system is satisfactory. A drying time before pickling of 30 minutes at room temperature is sufficient.

Masking tape may be applied by hand or by machine, and the chlorinated primers can be applied in the same way as the lacquer.

Where the steel sheet has no mill scale before pickling, artificial scaling of the area which is to be free of zinc must be carried out. This is done by heating as already described.

The normal pickling solution is about 7% sulphuric acid. Inhibitors and foaming agents may be added to reduce the severity of the attack of the acid on the exposed steel once the scale has been partly removed. The pickling bath is normally used at a temperature of about 140° F., and the acid content may vary from 5 to 10%, the temperature from 120° to 150° and the time of pickling from 8 to 30 minutes. A wide range of operating limits will not interfere with the utility of the invention as far as maintenance of the masking according to the invention is concerned, but may cause under or over pickling of the exposed areas.

The normal operating range for the temperature of the galvanizing bath is about 850° to 880°, but here again the limits are dictated by conventional galvanizing requirements and may be extended without affecting the ability of the invention to localize the galvanized coating.

The seams are welded before and after galvanizing by producing a submerged-melt weld at a rate of 60 to 100 inches per minute. (Hand welding can accomplish only about 5 to 10 inches per minute.) The sheet steel used is open hearth steel, commercial grade, welding quality, with low sulphur content.

An example of the carrying out of the invention is given as an illustration only, as follows: the shape to be galvanized is fabricated and where the fabrication involved welding in the same general location as welding to be carried out after galvanizing, the steel was heated between 100 and 1200° F. Then a localized coating of lacquer EC-968 was applied by dipping the portions where welding would be required for final assembly. After drying for 30 minutes, the work was placed in a pickling bath of 7% sulphuric acid solution, at 140° F. After immersion in the bath for 10 minutes, the piece was rinsed and then prefluxed in a 50% solution of zinc ammonium chloride. After draining, the residual preflux was dried at 180° F. for 10 minutes.

The work was then immersed in pure zinc at 860° F. The zinc was of prime Western grade, on which was a floating bath of ammonium chloride flux, molten at the galvanized temperature. The work was passed through the flux on immersion, but a part of the zinc bath was kept clear of the flux and after 4 minutes immersion the piece was withdrawn through this part. The masking compound not having been stripped, particles of it were left in charred condition on the piece and were brushed off after the piece was removed.

The assembly was then completed in the usual manner by welding.

It is to be understood that the form of the invention herewith shown and described is to be taken as a preferred example of the same, and that various changes in the shape, size and arrangement of the parts may be resorted to without departing from the spirit of the invention or the scope of the subjoined claims.

What I claim as my invention is:

1. A method of galvanizing a sheet metal article coated with a layer of the oxide of the metal and having areas selected for joining parts of the article by welding, comprising the steps of covering the said selected areas with a masking material impervious to an acid pickling bath and destructible by a galvanizing bath containing molten zinc, pickling the article in the pickling bath to remove the oxide coating from the remaining areas and retain the oxide coating under the masked selected areas, and immersing the article in the galvanizing bath whereby the said remaining areas are galvanized and the retained oxide coating on the said selected areas keeps them in a zinc-free condition for welding the masking material being substantially wholly destroyed before the galvanizing step is completed.

2. A method as claimed in claim 1 in which the impervious material is a stripping lacquer.

3. A method as claimed in claim 1 in which the impervious masking material is a chlorinated rubber base paint primer.

4. A method as claimed in claim 1 in which the masking material is masking tape.

5. A method as claimed in claim 1 in which the pickling bath is a solution of sulphuric acid in water.

6. A method according to claim 1 in which the pickling bath is a solution of about 7% sulphuric acid and water.

7. A method of fabricating a sheet metal article having areas selected for joining by welding, and having a layer of the oxide of the metal on the said areas, comprising the steps of covering the said areas with a masking material impervious to an acid pickling bath and destructible by a galvanizing bath containing molten zinc, pickling the article in the pickling bath to remove the oxide coating from the remaining areas and retain the oxide layer on the masked areas, immersing the article in the galvanizing bath, whereby the said remaining areas are galvanized and the retained oxide coating on the said selected areas keeps them in a zinc-free condition for welding, the masking material being substantially wholly destroyed before the galvanizing step is completed, and welding the said areas together.

References Cited in the file of this patent

UNITED STATES PATENTS

| | | |
|---|---|---|
| 1,159,820 | Armstrong | Nov. 9, 1915 |
| 1,231,285 | Mueller | June 26, 1917 |
| 1,254,796 | Greenfield | Jan. 29, 1918 |
| 2,309,801 | Veeder | Feb. 2, 1943 |
| 2,342,357 | Miller | Feb. 22, 1944 |
| 2,498,485 | Clawson | Feb. 21, 1950 |